(12) United States Patent
Toepfer

(10) Patent No.: US 8,940,425 B2
(45) Date of Patent: Jan. 27, 2015

(54) PLASTIC LIQUID HEAT EXCHANGER FOR BATTERY COOLING SYSTEM

(75) Inventor: Stefan Toepfer, Mainz-Kostheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 193 days.

(21) Appl. No.: 13/356,765

(22) Filed: Jan. 24, 2012

(65) Prior Publication Data

US 2013/0189556 A1 Jul. 25, 2013

(51) Int. Cl.
*H01M 2/18* (2006.01)

(52) U.S. Cl.
USPC .......................................................... 429/120

(58) Field of Classification Search
None
See application file for complete search history.

(56) References Cited

U.S. PATENT DOCUMENTS

| | | |
|---|---|---|
| 2011/0091750 A1 | 4/2011 | Claypole et al. |
| 2011/0151300 A1 | 6/2011 | Herrmann |
| 2013/0244077 A1* | 9/2013 | Palanchon et al. ............ 429/120 |

FOREIGN PATENT DOCUMENTS

| | | |
|---|---|---|
| CN | 101772851 A | 7/2010 |
| CN | 102163758 A | 8/2011 |

* cited by examiner

*Primary Examiner* — Patrick Ryan
*Assistant Examiner* — Wyatt McConnell
(74) *Attorney, Agent, or Firm* — Fraser Clemens Martin & Miller LLC; James D. Miller

(57) ABSTRACT

Plate assemblies for a heat exchanger suitable for use in a battery assembly are provided. A plate assembly can include a first substantially planar member having a first side, a second side, a first opening, and a second opening. A first conduit extends from the first opening on the first side and a second conduit extends from the second opening on the first side. A first spacer extends from the second side. Some plate assemblies include a second substantially planar member having a third side, a fourth side, a third opening, and a fourth opening. The third side faces the first side, the first conduit connects the first opening on the first side and the third opening on the third side, and the second conduit connects the second opening on the first side and the fourth opening on the third side. A second spacer extends from the fourth side.

18 Claims, 5 Drawing Sheets

US 8,940,425 B2

PLASTIC LIQUID HEAT EXCHANGER FOR BATTERY COOLING SYSTEM

FIELD OF THE INVENTION

The present technology relates to a cooling system, including a heat exchanger comprising plate assemblies formed of plastic with a reduced number of bonding seams that accommodate swelling of battery cells.

BACKGROUND OF THE INVENTION

This section provides background information related to the present disclosure which is not necessarily prior art.

Electrical systems within vehicles, such as hybrid, electric, and fuel cell vehicles, have advanced in complexity and power usage. Such vehicles can use an electric motor in combination with a battery power source. The battery can power the vehicle alone or can work in conjunction with another power source, such as an internal combustion engine.

High power output and large capacity batteries can be used as the power source; e.g., nickel-metal hydride or lithium-ion polymer batteries. A number of battery cells can be connected in series or parallel with each other so as to construct a larger battery assembly. The battery cells can be packaged together with various mechanical and electrical couplings between the battery cells to form the assembly. Battery cells can include prismatic batteries or pouch-shaped batteries that can be placed in a stacked relationship to reduce space and overall size of the assembly. Such battery cells can exhibit changes in thickness during charging/discharging and over their lifetime.

Heat can be generated by the battery cells during charging and discharging processes. Heat that accumulates in the battery assembly can adversely affect the battery cells. Consequently, a cooling system can be provided to maintain a desirable operating temperature. Such cooling systems can include air blown over the cells and/or liquid cooling systems can be used. These cooling systems, however, can present high manufacturing and maintenance costs, and issues may arise due to the relatively high number of parts, including seals and joints needed between parts.

SUMMARY OF THE INVENTION

The present technology includes systems, methods, and articles of manufacture that include a plate assembly for a heat exchanger.

In some embodiments, a plate assembly includes a first substantially planar member having a first side, a second side, a first opening, and a second opening. A first conduit extends from the first opening on the first side and a second conduit extends from the second opening on the first side. A first spacer extends from the second side. The plate assembly can further comprise a second substantially planar member having a third side, a fourth side, a third opening, and a fourth opening. In this case, the third side faces the first side, the first conduit connects the first opening on the first side and the third opening on the third side, and the second conduit connects the second opening on the first side and the fourth opening on the third side. A second spacer is included that extends from the fourth side.

In certain embodiments, the heat exchanger comprises two such plate assemblies where the first spacer from one plate assembly is slidably engaged, received, or positioned within or about the second spacer from the other plate assembly to form a flow field.

In various embodiments, a battery assembly includes a plate assembly and a battery cell adjacent the first side. In some embodiments, the battery assembly comprises a heat exchanger, a first battery cell disposed between the first substantially planar member and the second substantially planar member of the one plate assembly, and a second battery cell disposed between the first substantially planar member and the second substantially planar member of the other plate assembly.

In certain embodiments, a battery cooling system comprises a battery assembly and a coolant loop comprising an outlet and an inlet, the outlet fluidly coupled to the first conduit of one of the plate assemblies and the inlet fluidly coupled to the second conduit of the one of the plate assemblies. Coolant is disposed within the coolant loop and the battery cooling system is configured to allow coolant to flow from the inlet through the first conduit of the one of the plate assemblies, through the flow field, and through the second conduit to the outlet.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF EXEMPLARY EMBODIMENTS OF THE INVENTION

Figure 1:
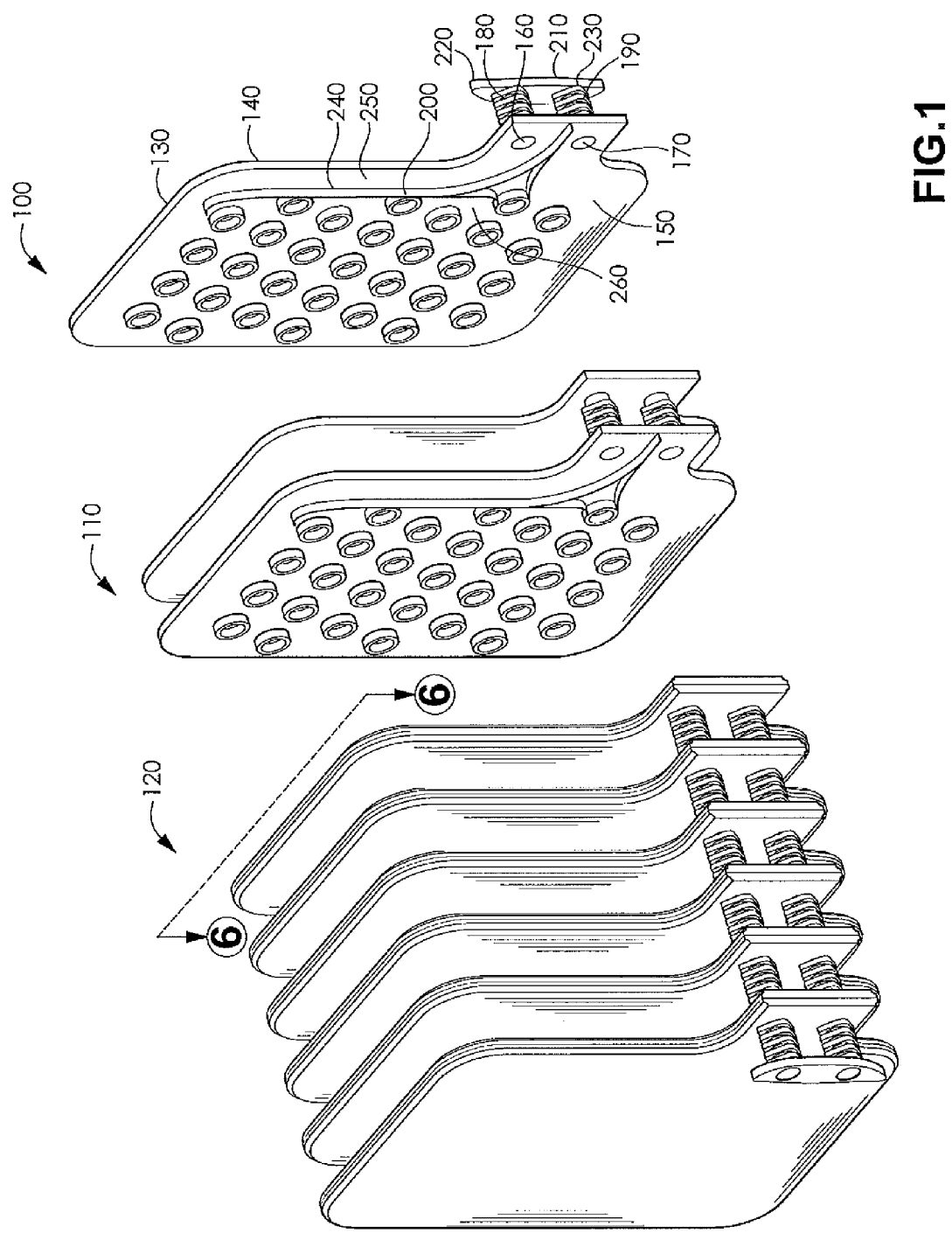
FIG. 1 is a partially exploded perspective view of plate assemblies and a heat exchanger formed by coupling such plate assemblies.

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments where possible.

The present technology relates to a plate for a heat exchanger suitable for use in a temperature regulation system for a battery assembly. The plate includes one or more integrated conduits and one or more integrated spacers. The plate can be mated to another such plate to form a heat exchanger comprising a flow field for circulating a fluid. The heat exchanger can be used to regulate the temperature of one or more battery cells in a battery assembly. The heat exchanger provides a reduction in the number of parts compared to other heat exchangers. This allows for fewer joints, seals, and/or seams in the heat exchanger, which can provide an improved cooling system with respect to construction, weight, and costs. In particular, the plates can be formed of plastic molded to include conduits such as expansion bellows and various spacers. There is hence no need to braze separate components together (e.g., plate assemblies and expansion bellows) in forming a flow field for a heat exchanger, thereby eliminating issues that can arise with joining dissimilar materials, for example.

A battery assembly for use in a vehicle can be configured to supply high voltage direct current (DC) power to an inverter, which can include a three-phase circuit coupled to a motor to convert the DC power to alternating current (AC) power. In this regard, the inverter can include a switch network having an input coupled to the battery assembly and an output coupled to the motor. The switch network can include various series switches (e.g., insulated gate bipolar transistors (IGBTs) within integrated circuits formed on semiconductor substrates) with antiparallel diodes (i.e., antiparallel to each switch) corresponding to each of the phases of the motor. The battery assembly can include voltage adaption or transformation, such as DC/DC converters. One or more battery assemblies may be distributed within a vehicle where each battery assembly can be made up of a number of battery cells. The battery cells can be connected in series or parallel to collectively provide voltage to the inverter.

The battery assembly can be cooled by a fluid that flows through a coolant loop that includes a heat exchanger. The fluid flows into one or more inlets of the battery assembly and through the interior of the battery assembly to exchange heat with the battery cells. The fluid then flows through one or more outlets of the battery assembly. The fluid can then be recirculated through the coolant loop. For example, a pump can facilitate the movement of the fluid through the coolant loop. The term "coolant" is used herein to refer to the fluid, although it should be noted that the coolant may heat or cool various components within the vehicle, including the battery assembly. The coolant can include any liquid that absorbs or transfers heat to cool or heat an associated component, such as water and/or ethylene glycol (i.e., "antifreeze").

Referring to FIG. 1, various plate assemblies 100, 110 and assembly thereof into a heat exchanger 120 are shown. A plate assembly 100 for a heat exchanger 120 can include a first substantially planar member 130 having a first side 140, a second side 150, a first opening 160, and a second opening 170. A first conduit 180 extends from the first opening 160 on the first side 140 and a second conduit 190 extends from the second opening 170 on the first side 140. These conduits 180, 190 can take the form of an expansion bellows. A first spacer 200 extends from the second side 150 of the first substantially planar member 130. The plate assembly 100 can also include a plurality of first spacers 200 that extend from the second side 150. As shown, the plurality of spacers 200 can include an array of dimples spaced about the second side 150 of the substantially planar member 130. Various sizes, shapes, and configurations of spacers 200 can be used. In some embodiments, the plate assembly 100 can further comprise a flange 210 coupling a distal end 220 of the first conduit 180 and a distal end 230 of the second conduit 190. The first spacer 200 can further comprise a wall 240 extending from the second side 150 and partially partitioning a first portion 250 of the second side 150 comprising the first opening 160 from a second portion 260 of the second side 150 comprising the second opening 170.

Figure 4:
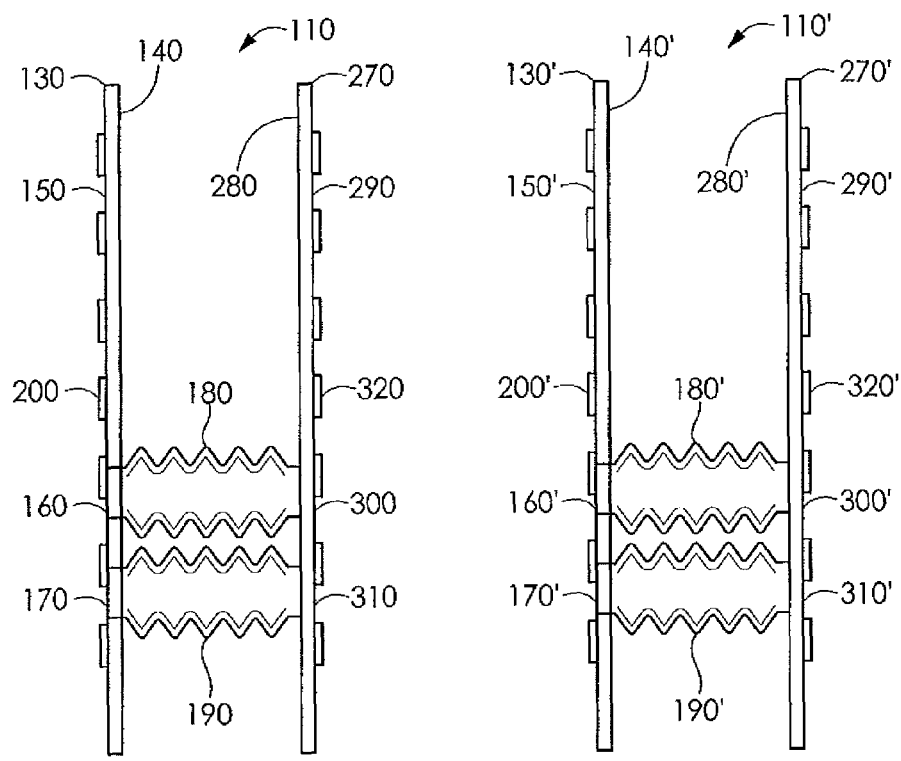
FIG. 4 shows a side elevational view of two plate assemblies prior to coupling to form a flow field.

Referring to FIGS. 1, 2, and 4, the plate assembly 110 can further include a second substantially planar member 270 having a third side 280, a fourth side 290, a third opening 300, and a fourth opening 310. The third side 280 of the second substantially planar member 270 faces the first side 140 of the first substantially planar member 130. The first conduit 180 connects the first opening 160 from the first side 140 and the third opening 300 from the third side 280 and the second conduit 190 connects the second opening 170 from the first side 140 and the fourth opening 310 from the third side 280. The conduits 180, 190 can take the form of an expansion bellows to permit changes in spacing between the first and second substantially planar members 130, 270. A second spacer 320 extends from the fourth side 290 of the second substantially planar member 270. The plate assembly 110 can further comprise a plurality of second spacers 320 extending from the fourth side 290. As shown, the plurality of spacers 320 can include an array of dimples spaced about the fourth side 290 of the second substantially planar member 270. Various sizes, shapes, and configurations of spacers 320 can be used. The second spacer 320 can comprise a wall 330 extending from the fourth side 290 and partially partitioning a first portion 340 of the fourth side 290 comprising the third opening 300 from a second portion 350 of the fourth side 290 comprising the fourth opening 310.

Figure 2A:
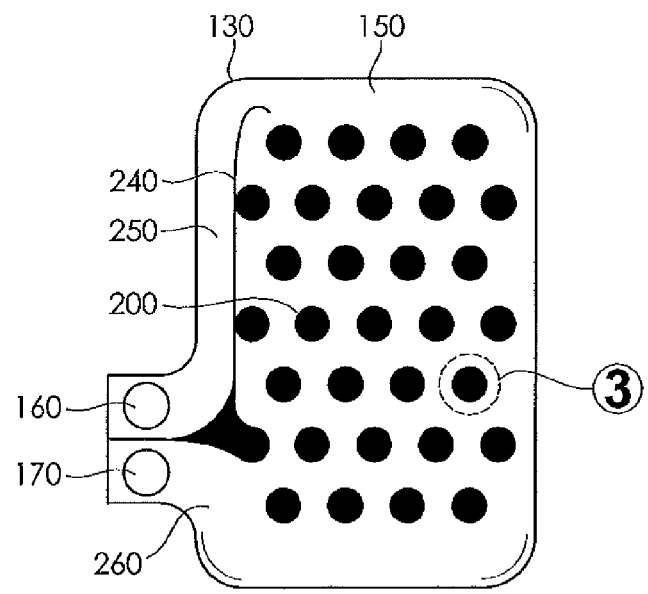
FIG. 2A shows an elevational view of a first side of a plate assembly.
Figure 2B:
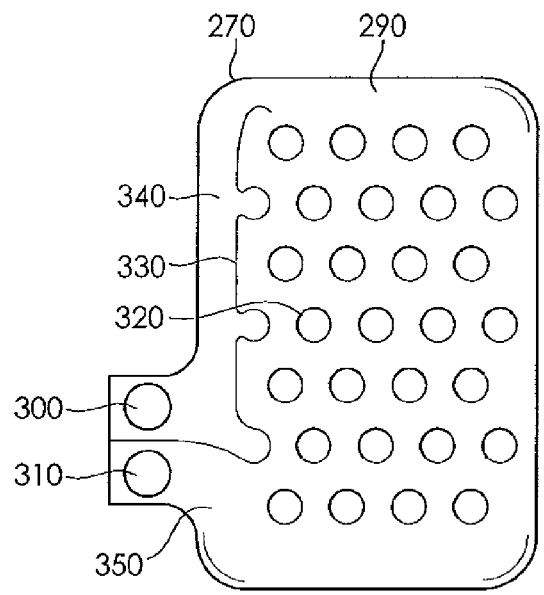
FIG. 2B shows an elevational view of a second side of a plate assembly.
Figure 3:
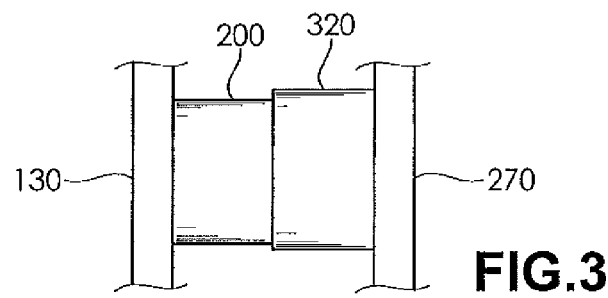
FIG. 3 is a perspective view of a coupled spacer between plate assemblies.
Figure 5:
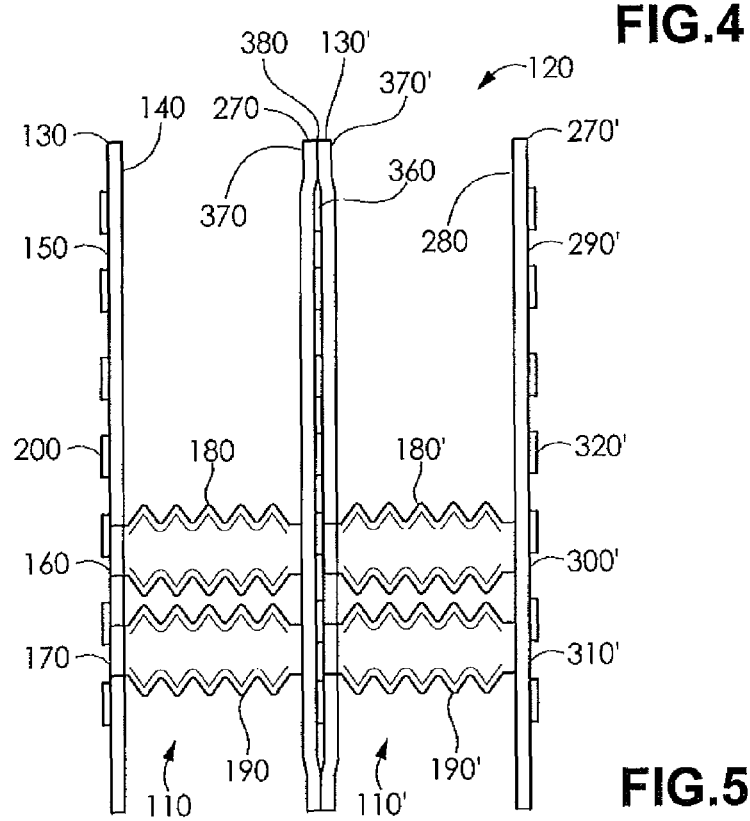
FIG. 5 shows a side elevational view of two plate assemblies with spacers coupled to form a flow field where a portion of the perimeters of the substantially planar members is sealed.

The first spacer 200 can also be configured to couple, cooperate, slidably engage, or receive with the second spacer 320 of an adjacent plate assembly 110. For example, the first spacer 200 can be configured to receive the second spacer 320, as shown in FIGS. 2A, 2B, and 3, where the first spacer 200 is a solid dimple that fits into the second spacer 320, being a hollow dimple. This can allow the plate assembly 110 to be joined to another plate assembly 110; e.g., where the two plate assemblies 110 (e.g., FIG. 4) are coupled (e.g., FIG. 5). For example, as shown in FIGS. 4 and 5, one plate assembly 110 can be joined to another plate assembly 110' having similar features designated by prime reference numerals. In some cases, however, the first spacer 200 can be identical to the second spacer 320. Where the first and second spacers 200, 320 are identical in the plate assembly 110, two different plate 110 assemblies can be joined; e.g., where one plate assembly 110 only has hollow dimples as spacers 200, 320 and the other plate assembly 110 only has solid dimples as spacers 200, 320.

The spacers 200, 320 can be configured so that they remain engaged with each other along a length of each spacer projecting from the substantially planar members 140, 270. For example, as shown in FIG. 3, the solid first spacer 200 can slide into the hollow second spacer 320. In some embodiments, the solid first spacer 200 can slide into the hollow second spacer 320 where at least a portion of the solid first spacer is covered by the hollow second spacer 320. In certain embodiments, the solid first spacer 200 can slide into the hollow second spacer 320 so that most of the solid first spacer is covered by the hollow second spacer 320. In other embodiments, the entire solid first spacer 200 can slide into the hollow second spacer 320. Although the spacers 200, 320 are shown having circular cross-sections in the Figures, various shaped cross-sections are possible. Moreover, the spacers 200, 320 can project generally perpendicularly from the substantially planar members 130, 270, but can also be angled or tapered in their projecting profile; e.g., the spacers 200, 320 can be frustoconical in profile.

The plate assemblies 100, 110 can be formed of various materials and in some cases can be made of plastic. In particular, the plate assembly 100, 110 can be formed of a single piece of material so that there is no need to seal, braze, or weld the various portions together. For example, the whole plate assembly 100, 110 can be formed by injection molding or casting a plastic, metal, or composite material. Some features can be subsequently stamped, pressed, or thermoformed into the plate assembly 100, 110; e.g., plastic first and second substantially planar members 130, 270 can be injection molded and then thermoformed to form spacers 200, 320.

A heat exchanger 120 can be formed using two plate assemblies 110, 110', as shown in FIG. 5, where the first spacer 200 from one plate assembly 110 is coupled or slidably engaged with the second spacer 320' from the other plate assembly 110' to form a flow field 360. The two plate assemblies 110, 110' can each have a plurality of spacers configured to couple the plates together.

Figure 6:
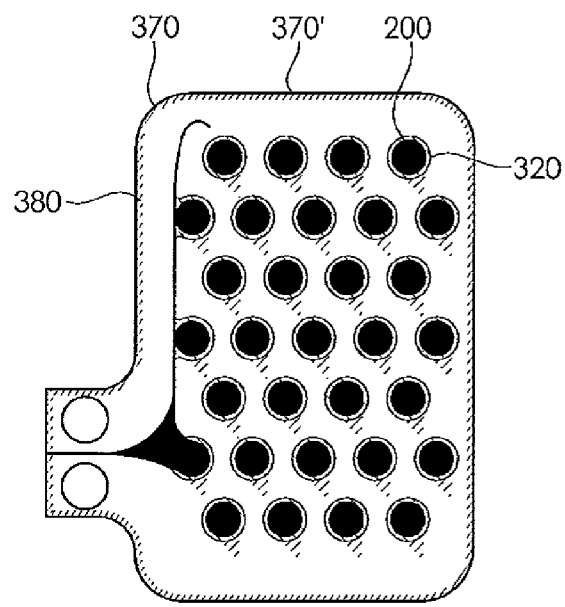
FIG. 6 shows a cross-sectional view taken as shown in FIG. 1 of two plate assemblies with spacers coupled to form a flow field where the entire perimeter is sealed.

A perimeter 370 of the first or second substantially planar member 130, 270 of one plate assembly 110 and a perimeter 370' of the first or second substantially planar member 130', 270' of the other plate assembly 110' can be sealed 380 together. The seal can be formed by welding; for example, ultrasonic welding where the plate assemblies 110, 110' are formed of plastic. Alternatively, the sealed 380 perimeter can be formed using a gasket or sealant. Coolant can be circulated through the respective conduits 180, 190, 180', 190' within the flow field 360. As shown in FIG. 6, which is a cross-section of two joined plate assemblies 110, 110' in a portion of the heat exchanger 120 in FIG. 1, the entire perimeters 370, 370' are sealed 380 together. In this manner, a coolant can be contained within the flow field 360.

Figure 7:
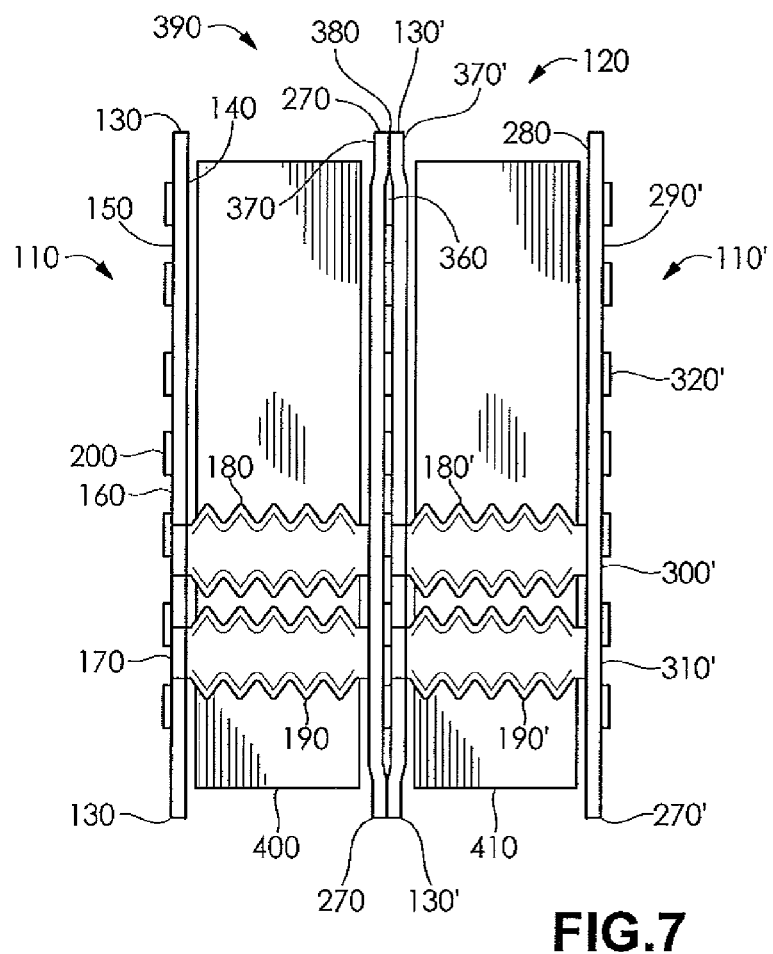
FIG. 7 shows a side elevational view of two plate assemblies with spacers coupled to form a flow field positioned relative to two battery cells.

Referring now to FIG. 7, a battery assembly 390 is provided that comprises a plate assembly 110 as described and a battery cell 400 adjacent the first side 140 of the plate assembly 110. The battery assembly 390 can also include a heat exchanger 120 as described along with a first battery cell 400 and a second battery cell 410. The first battery cell 400 can be disposed between the first substantially planar member 130 and the second substantially planar member 270 of the one plate assembly. The second battery cell 410 can be disposed between the first substantially planar member 130' and the second substantially planar member 270' of the other plate assembly 110'.

A battery cooling system 420 is also provided that includes a battery assembly 390 as described along with a coolant loop 430, as shown in FIG. 7. The coolant loop 430 includes an inlet 440 and an outlet 450, the inlet 440 fluidly coupled to the first conduit 180 of one of the plate assemblies 110, 110' and the outlet 450 fluidly coupled to the second conduit 190 of the one of the plate assemblies 110, 110'. Coolant is contained within the coolant loop 430. The battery cooling system 420 is configured to allow coolant to flow from the inlet 440 of the coolant loop 430 through the first conduit 180 of the one of the plate assemblies 110, 110', through the flow field 360, and through the second conduit 190 to the outlet 450 of the coolant loop 430.

Further regarding the flow field 360, the coolant can flow through the first conduit 180 between substantially planar members 270, 130' with spacing defined by coupled spacers 320, 200'. As coolant enters between the substantially planar members 270, 130' through first conduct 180 and opening 160, the coolant can be directed to flow across most or all of the surface of the substantially planar members 270, 130' by the wall 240, which separates the first portion 250 comprising the first opening 160 from the second portion 260 comprising the second opening 170, where the coolant enters the second opening 170 to the second conduit 190. The coolant can flow about the various spacers 200, 320 forming part of the walls 240, 330 and/or the separate coupled spacers 200, 320 as shown in the Figures. The outside of the flow field 360 (e.g., the third side 280 of one plate assembly 110 and the first side 140' of another plate assembly 110') can be positioned proximate at least one of the first battery cell 400 and the second battery cell 410 in order to provide heat transfer between the flow field 360 and the battery cells 400, 410; e.g., the outside of the flow field 360 can contact at least one of the first battery cell 400 and the second battery cell 410.

The battery cells 400, 410 can be prismatic batteries or pouch-shaped batteries that can be placed in a stacked relationship to reduce space and overall size of a battery assembly. Such battery cells 400, 410 can exhibit changes in thickness during charging/discharging and over their lifetime. The present plate assemblies 110, 110' when coupled and sealed 380 to form one or more flow fields 360 can adjust to the changes in thickness of the battery cells 400, 410. In particular, the spacers 200, 320 can slide relative to each other allowing the distance between the substantially planar members 130', 270 of the coupled plate assemblies 110, 110' to change. For example, a pressure of coolant within the flow field 360 can be adjusted to expand or reduce the distance between the substantially planar members 130', 270; e.g., the sealed 380 substantially planar members 130', 270 can be formed of a resilient and flexible material where they flex outwards when the pressure of the coolant is increased. In some cases, the battery cells 400, 410 can swell and push the substantially planar members 130', 270 together where, for example, the solid first spacer 200 is pushed further into the hollow second spacer 320. In other cases, the battery cells 400, 410 can contract and the distance between the substantially planar members 130', 270 can be increased by increasing the coolant pressure where the solid first spacer 200 and the hollow second spacer 320 slide away from each other. In this manner, the variations in the thickness of the battery cells 400, 410 during charging/discharging can be accommodated by changes in coolant pressure within the flow field 360. This allows the substantially planar members 130', 270 to remain in direct contact or to remain proximate to the battery cells 400, 410 to provide improved heat transfer. For example, the battery cells 400, 410 and the flow field 360 can "breathe" together while the spacers 200, 320 slide relative to each other to accommodate changes in thickness of the battery assembly, thereby maintaining a cooling efficiency at various thicknesses.

Figure 8:
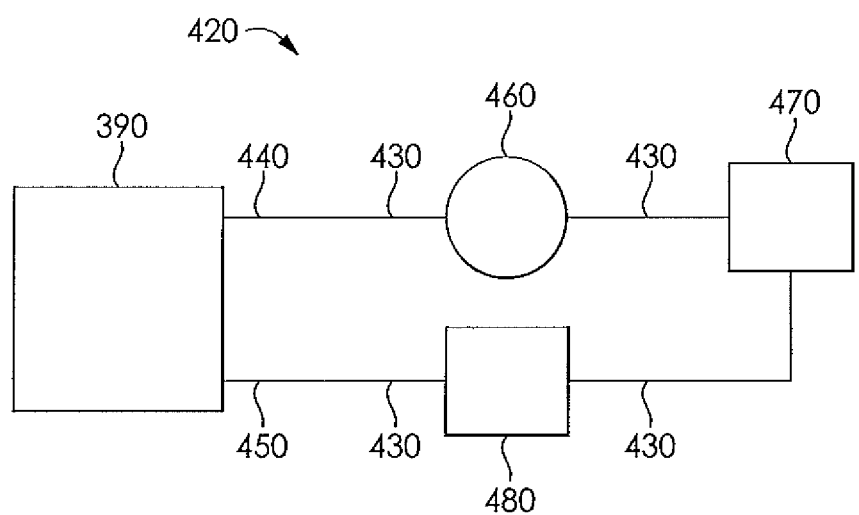
FIG. 8 shows a schematic diagram of a battery cooling system.

Referring again to FIG. 8, a pump 460 can be used to move the coolant through the coolant loop 430 and the flow field 360 in the heat exchanger 120. In some embodiments, the coolant loop 430 can run to a coolant reservoir 470 and in various embodiments the coolant loop 430 can run to another component 480 of the vehicle where heat transfer may be desired. The component 480 can include one or more of a power plant, a fuel cell, and a climate control system, for example.

The present technology provides several benefits. These include improved temperature regulation that can increase battery life cycle. Plastic components can be used to replace several metal components that would require metal bonding (e.g., welding, brazing etc.). For example, a plastic heat exchanger can have 6 seams versus 34 to 40 seams in a metal heat exchanger. Molding the plate assemblies as single pieces can provide fewer parts, less weight, less material costs, and less manufacturing costs.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A plate assembly for a heat exchanger comprising:
   a first substantially planar member having a first side, a second side, a first opening, and a second opening;
   a first conduit extending from the first opening on the first side;
   a second conduit extending from the second opening on the first side;
   a first spacer extending from the second side;
   a second substantially planar member having a third side, a fourth side, a third opening, and a fourth opening, wherein the third side faces the first side, the first conduit connects the first opening on the first side and the third opening on the third side, and the second conduit connects the second opening on the first side and the fourth opening on the third side; and
   a second spacer extending from the fourth side, wherein the first spacer is a soled projection and the second spacer is a projection having a hollow opening formed therein;
   wherein the hollow opening formed in the second spacer has a size and shape substantially corresponding to a size and shape of an exterior surface of the first spacer.

2. The plate assembly according to claim 1, further comprising a plurality of first spacers extending from the second side.

3. The plate assembly according to claim 1, further comprising a flange coupling a distal end of the first conduit and a distal end of the second conduit.

4. The plate assembly according to claim 1, wherein the first spacer further comprises a wall extending from the second side and partially partitioning a first portion of the second side comprising the first opening from a second portion of the second side comprising the second opening.

5. The plate assembly according to claim 1, further comprising a plurality of second spacers extending from the fourth side.

6. The plate assembly according to claim 1, wherein the plate assembly is formed of plastic.

7. A heat exchanger comprising:
   two plate assemblies, each including:
      a first substantially planar member having a first side, a second side, a first opening, and a second opening;
      a first conduit extending from the first opening on the first side;
      a second conduit extending from the second opening on the first side;
      a first spacer extending from the second side;
      a second substantially planar member having a third side, a fourth side, a third opening, and a fourth opening, wherein the third side faces the first side, the first conduit connects the first opening on the first side and the third opening on the third side, and the second conduit connects the second opening on the first side and the fourth opening on the third side; and
      a second spacer extending from the fourth side, wherein the first spacer is a solid projection and the second spacer is a projection having a hollow opening formed therein, wherein the first spacer from one plate assembly is coupled with the second spacer from the other plate assembly to form a flow field, and wherein the hollow opening formed in the second spacer from the one plate assembly receives the first spacer from the other plate assembly therein.

8. The heat exchanger according to claim 7, wherein the plate assemblies are formed of plastic.

9. The heat exchanger according to claim 7, wherein a perimeter of the first substantially planar member of one plate assembly and a perimeter of the second substantially planar member of the other plate assembly are sealed together.

10. The heat exchanger according to claim 7, wherein a perimeter of the first substantially planar member of one plate assembly and a perimeter of the second substantially planar member of the other plate assembly are welded together.

11. The heat exchanger according to claim 7, further comprising a coolant within the flow field.

12. A battery assembly comprising:
   a plate assembly according to claim 1; and
   a battery cell adjacent the first side.

13. A battery assembly comprising:
   a heat exchanger according to claim 7;
   a first battery cell disposed between the first substantially planar member and the second substantially planar member of the one plate assembly; and
   a second battery cell disposed between the first substantially planar member and the second substantially planar member of the other plate assembly.

14. A battery cooling system comprising:
   a battery assembly according to claim 13;
   a coolant loop comprising an inlet and an outlet, the inlet fluidly coupled to the first conduit of one of the plate assemblies and the outlet fluidly coupled to the second conduit of the one of the plate assemblies; and
   coolant within the coolant loop, wherein the battery cooling system is configured to allow coolant to flow from the inlet through the first conduit of the one of the plate assemblies, through the flow field, and through the second conduit to the outlet.

15. The heat exchanger according to claim 7, wherein one of the first spacer and the second spacer is a solid dimple and the other of the first spacer an the second spacer is a hollow dimple, the solid dimple configured to fit into the hollow dimple.

16. The plate assembly according to claim 1, wherein the hollow opening formed in the second spacer has an inner diameter substantially corresponding to an outer diameter of the first spacer.

17. The plate assembly according claim 1, wherein a cross-section of the hollow opening formed in the second spacer and a cross-section of the first spacer have substantially equal sized and shapes.

18. A plate assembly for a heat exchanger comprising:
   a first substantially planar member having a first side, a second side, a first opening, and a second opening;

a first conduit extending from the first opening on the first side;
a second conduit extending from the second opening on the first side;
a first spacer extending from the second side;
a second substantially planar member having a third side, a fourth side, a third opening, and a fourth opening, wherein the third side faces the first side, the first conduit connects the first opening on the first side and the third opening on the third side, and the second conduit connects the second opening on the first side and the fourth opening on the third side;
a third substantially planar member having a fifth side, wherein the fifth side faces the second side; and
a second spacer extending from the fifth side, wherein one of the first spacer and the second spacer includes a hollow opening formed therein configured to receive the other of the first spacer and the second spacer therein to couple the first substantially planar member to the third substantially planar member and form a flow field therebetween.

* * * * *